Apr. 24, 1923.

E. SCHRÖDER 1,452,762

ELECTRIC SEAM WELDING MACHINE

Filed March 15, 1920

Inventor
Edmund Schröder.
By William C. Linton
Attorney.

Patented Apr. 24, 1923.

1,452,762

UNITED STATES PATENT OFFICE.

EDMUND SCHRÖDER, OF BERLIN, GERMANY.

ELECTRIC SEAM-WELDING MACHINE.

Application filed March 15, 1920. Serial No. 366,177.

*To all whom it may concern:*

Be it known that I, EDMUND SCHRÖDER, engineer, a citizen of the German Republic, residing at Nos. 48-51 Maybach-Ufer, Berlin, Germany, have invented certain new and useful Improvements in Electric Seam-Welding Machines, of which the following is a specification.

This invention relates to electric seam welding machines and it is an improvement upon machines of the kind described in my co-pending application Serial No. 329,629 filed Oct. 9, 1919.

In these prior arrangements a roller electrode, bearing on the seam to be welded, is successively turned a predetermined short distance. After each of these part-rotations has been accomplished, the circuit containing the roller electrode is closed. Welding thus takes place while this electrode is at rest on the seam which is successively subjected throughout its entire length to such intermittent action.

My present invention, which is especially for welding longitudinal seams of tubes, will be understood from the following description and be particularly pointed out in the appended claims, reference being had to the accompanying drawing which by way of example shows different forms of construction of the novel machine.

Figure 1:
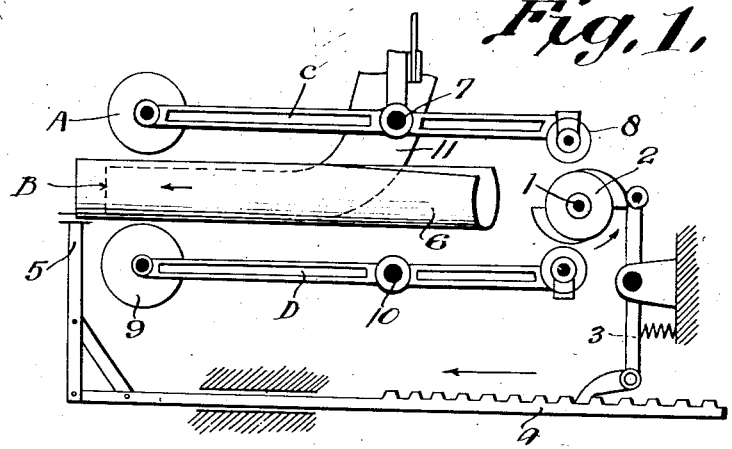
Figure 2:
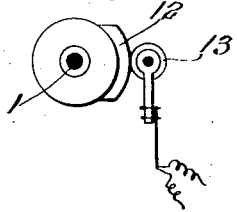
Figure 3:
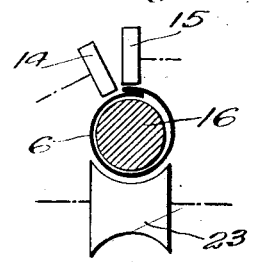
Figure 4:
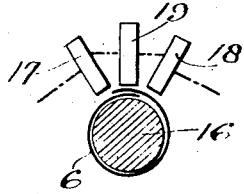
Figure 5:
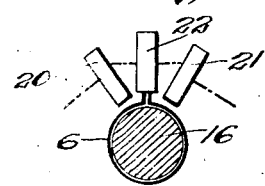

In this drawing, Fig. 1 is an elevation representing the general arrangement of parts, all the parts being assumed for the sake of simplicity to lie in one plane; Fig. 2 is a sectional elevation of a switch for automatically closing the circuit used for welding; Figs. 3 to 5 are sectional views showing combinations of roller electrodes.

As shown in Fig. 1, a main shaft 1 is fitted with a cam 2 which by means of a lever 3 and a pawl attached to the latter is adapted to act on a rack 4. This rack is furnished with pincers 5, or any other suitable device, in order to be able to be detachably fixed to the tube 6 or other work piece to be welded. The tube 6 is seated on a mandrel-shaped electrode B carried by a support 11. On the rotation of the main shift 1 the rack 4 and tube 6 are intermittently moved in the direction of the arrows. A roller electrode A is designed to be pressed intermittently against the seam to be welded. This roller electrode is carried by a lever C fulcrumed at 7 and provided with a roller 8 adapted to be acted upon by the cam 2. The latter is so adjusted as to be of no influence to the roller 8 during the time the rack 4 and tube 6 are displaced. Fulcrumed at 10 is a lever D carrying a roller 9. This roller serves to lift and maintain the tube 6 out of contact with the mandrel electrode B as long as the tube is advancing along such mandrel. To this end the lever D is acted upon by the cam 2 or another cam disposed on the main shaft 1. The tube 6, which is delivered to the machine in an open state, is after passing the mandrel support 11 closed in a well-known manner by side rollers (not shown in the drawing).

The primary switch shown in Fig. 2 is mounted on the main shaft 1 and has a contact segment 12 to coact with a contact roller 13 so as to close the primary current brought by the electrodes A, B to weld the seam. This switch can be adjusted on the shaft 1 so that the circuit shall become closed at any desired moment during the time the tube 6 is at rest.

The described arrangement does away with any frictional contact taking place between the tube 6 and mandrel electrode B on the tube moving along the mandrel; and as on welding the tube does not move at all, the electrode disposed within it need not be a roller. This enables a mandrel to be employed as one of the electrodes. Such mandrel can be efficiently cooled in its interior and can be easily changed.

The mandrel if worn in part can be turned to present a fresh portion of its surface for the seam to rest upon on welding taking place. This may also be obtained by displacing the point of welding along the mandrel.

Provisions may be made for an automatic turning of the mandrel after each welding.

Fig. 3 shows a roller electrode 14 adapted to bear on the tube 6 immediately beside the overlapped seam thereof, and a roller electrode 15 designed to press against the seam. The interior of the tube is taken up by mandrel 16 not included in the circuit provided for the electrodes 14, 15, but being a mere support for the tube to prevent any deformation thereof.

In the arrangement represented in Fig. 4 two roller electrodes 17, 18 are disposed to act beside the seam, one on either side thereof, a third or pressure roller 19 bearing on the seam itself. The roller 19 is not included in the circuit and can therefore consist of some resistant material, such, for example, as steel or the like. The mandrel 16 is likewise made of hardened steel by preference.

According to Fig. 5 two roller electrodes 20, 21 are adapted to bear on the tube, one on either side of the seam thereof, and a third roller electrode 22 is provided as a pressure roller acting on the upturned edges of the seam, as shown. The electrodes 20, 21 constitute one pole of the circuit, and the electrode 22 is the other pole thereof.

A shown in Fig. 3, the tube 6 is in each case supported by a roller 23 in order to be able to resist the pressure of the roller electrodes or pressure rollers.

This invention enables stationary mandrels to be employed for filling out the interior of the tubes, without loss of power and a high wearing away of the mandrel. The mandrel 16 is preferably somewhat smaller than the inner diameter of the tube 6. It fills out the tube over a short distance only and is held by means of a rod corresponding in length to the length of the tube. The mandrel may be provided with an insulating cover. This will be advantageous especially in case the tube under treatment be of well-conducting material, for in such event a non-insulated mandrel would tend to cause loss of current.

Contact jaws, adapted to be brought in and out of contact with the tube, may be disposed instead of the described roller electrodes, such jaws being operated in accordance with the intermittent motion of the tube.

I claim:

1. In an electric seam welding machine, the combination of a roller electrode, a mandrel-shaped electrode, and a circuit for the two, with means for moving the work piece with its overlapped seam edges through between these electrodes and along the mandrel electrodes, means for advancing the work piece intermittently, and means for closing the said circuit while the work piece is at rest, substantially as set forth.

2. In an electric seam welding machine, the combination of a roller electrode, a mandrel-shaped electrode, and a circuit for the two, with a main shaft, a lever carrying such roller electrode, a rack adapted for attachment to the work-piece, a pawl engaging such rack, a lever carrying this pawl, means on the said main shaft for operating both said levers, and means for closing the said circuit while the work piece is at rest, substantially as set forth.

3. In an electric seam welding machine, the combination of a roller electrode, a mandrel-shaped electrode, and a circuit for the two, with a main shaft, a lever carrying the said roller electrode, a rack adapted for attachment to the work piece, a pawl engaging such rack, a lever carrying this pawl, means on the said main shaft for operating both said levers, means geared to this main shaft for sustaining the work piece seated on the mandrel electrode, and means for closing the said circuit while the work piece is at rest, substantially as set forth.

4. In an electric seam welding machine, the combination of a roller electrode, a mandrel-shaped electrode, and a circuit for the two, with a main shaft, a lever carrying the said roller electrode, a rack adapted for attachment to the work piece, a pawl engaging such rack, a lever carrying this pawl, a roller adapted to sustain the work piece seated on the said mandrel electrode, a lever carrying this roller, means on the said main shaft for operating the said three levers, and means for closing the said circuit while the work piece is at rest, substantially as set forth.

5. In an electric welding machine, the combination of a roller electrode, a mandrel-shaped electrode, a circuit for the two, a main shaft, a lever carrying the roller electrode, a rack adapted for attachment to the work piece, another lever mounted adjacent one end of the rack, a pawl on the last lever engageable with the rack, opposed cams on said main shaft engageable with the said first and last levers, whereby to disengage the roller electrode from the work piece and move said work piece longitudinally over the mandrel-shaped electrode, a work piece engaging roller mounted under the mandrel-shaped electrode and operable by certain of said cams for lifting said work piece from the mandrel-shaped electrode during movement of the work piece, and means for automatically closing the circuit while the work piece is at rest.

In testimony whereof I affix my signature.

EDMUND SCHRÖDER.